Oct. 26, 1954

H. CHRISTENSEN ET AL 2,692,839

METHOD OF FABRICATING GERMANIUM BODIES

Filed April 7, 1951

INVENTORS: H. CHRISTENSEN
G. K. TEAL

BY

ATTORNEY

Patented Oct. 26, 1954

2,692,839

UNITED STATES PATENT OFFICE 2,692,839

METHOD OF FABRICATING GERMANIUM BODIES

Howard Christensen, Springfield, and Gordon K. Teal, Summit, N. J., assignors to Bell Telephone Laboratories, Incorporated, New York, N. Y., a corporation of New York Application March 7, 1951, Serial No. 214,364

13 Claims. (Cl. 148—1.5)

This invention relates to methods of and apparatus for fabricating semiconductor bodies, more particularly germanium bodies, especially suitable for use in signal translating devices.

Signal translating devices of one type to which this invention is applicable comprise a body of germanium material including two contiguous zones or portions of opposite conductivity type, specifically N type and P type. Illustrative constructions, utilizable as rectifiers and photocells, are disclosed in the application Serial No. 156,188, filed April 15, 1950, of G. L. Pearson, and now Patent 2,629,800. Similar constructions, that is one involving germanium bodies including contiguous zones of opposite conductivity type, are employed in amplifiers of the class now known as transistors. Illustrative devices of this class are disclosed in the application Serial No. 35,423, filed June 26, 1948, of W. Shockley, now Patent 2,569,347 granted September 25, 1951.

The operating characteristics of such devices are dependent upon certain properties such as the crystalline structure and physical character of the zones in the body. Advantageously, for example, the zones are of single crystal structure and of uniform thickness.

One general object of this invention is to enable the fabrication of semiconductor bodies having zones of opposite conductivity type and preassigned characteristics therein. More specifically, objects of this invention are to facilitate the fabrication of germanium bodies of one conductivity type having on one face thereof a film or coating of the opposite conductivity type, to produce such a film or coating of single crystal structure having its crystal axes advantageously oriented relative to the axes of the body, to achieve such a film of uniform character and to expedite realization of such a film of prescribed properties.

In accordance with one broad feature of this invention, a film or layer of semiconductive material of one conductivity or conductivity type is formed on a body or substratum of the material of different conductivity or of the opposite conductivity type by pyrolytic deposition of the film or layer of material upon the body under controlled temperature and environmental conditions.

In accordance with a more specific feature of this invention, a single crystal film of N or P type germanium is formed upon a single crystal body of P or N type germanium respectively by pyrolytic decomposition of a germanium compound, for example germanium iodide, vapor in a chamber in which one or more bodies of single crystal P or N type germanium respectively are mounted. The film possesses high crystalline perfection, is of uniform and controllable composition and thickness and constitutes effectively an extension of the single crystal body.

The invention and the above noted and other features thereof will be understood more clearly and fully from the following detailed description with reference to the accompanying drawing in which.

Figure 1:
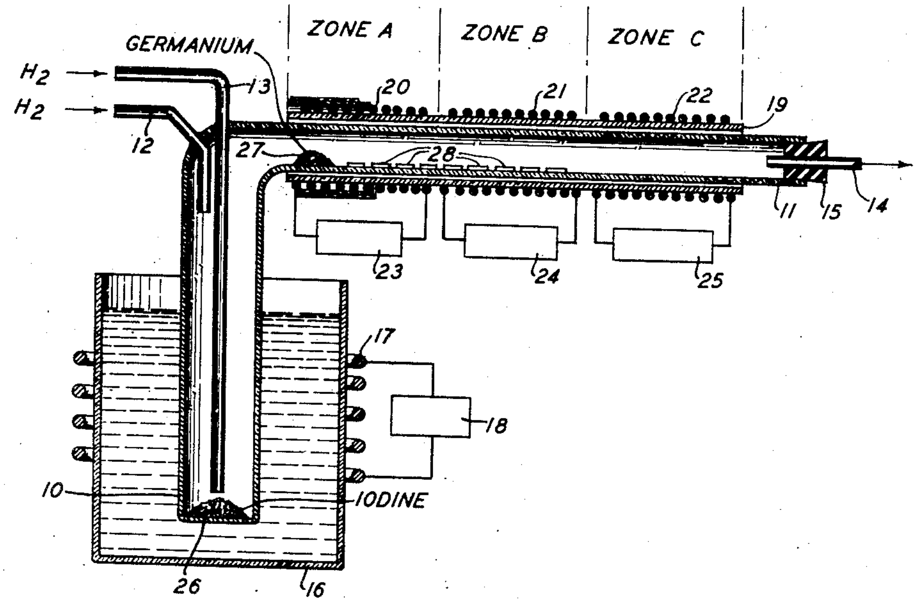
Fig. 1 is an elevational view, mainly in section, of apparatus for fabricating semiconductive bodies in accordance with this invention.

Referring now to Fig. 1, the apparatus therein illustrated comprises an L-shaped vessel, advantageously of quartz or the like, having a vertical portion 10 and a horizontal extending portion 11. Sealed to and extending into the vessel adjacent the junction of the two portions 10 and 11 are a pair of inlet tubes 12 and 13 through which, as described hereinafter, appropriate gas may be introduced into the vessel. The tube 12 it will be noted terminates slightly below the axis of the horizontal portion 11, whereas the tube 13 extends to immediately adjacent the base of the portion 10. An outlet tube 14 extends through a stopper 15 fitted into the open end of the vessel portion 11.

The vertical portion 10 of the reaction vessel is partly immersed in an oil bath 16 adapted to be maintained at a substantially constant temperature by a heater 17 energized from a source 18.

Disposed about the vessel portion 11 is a ceramic cylindrical tube 19 which has mounted thereon three resistance heater windings 20, 21 and 22 energized by suitable sources 23, 24 and 25 respectively. As shown, each of the heaters is associated with a respective zone A, B or C in the vessel portion 11.

The vessel portion 10 has upon its base a quantity of iodine 26. Within the vessel portion 11 and adjacent the left-hand or entry end of zone A is a quantity of germanium, which may be in the form of a powder or a single piece. Also mounted within the vessel portion 11 are a plurality of discs 28 of germanium.

Figure 2:
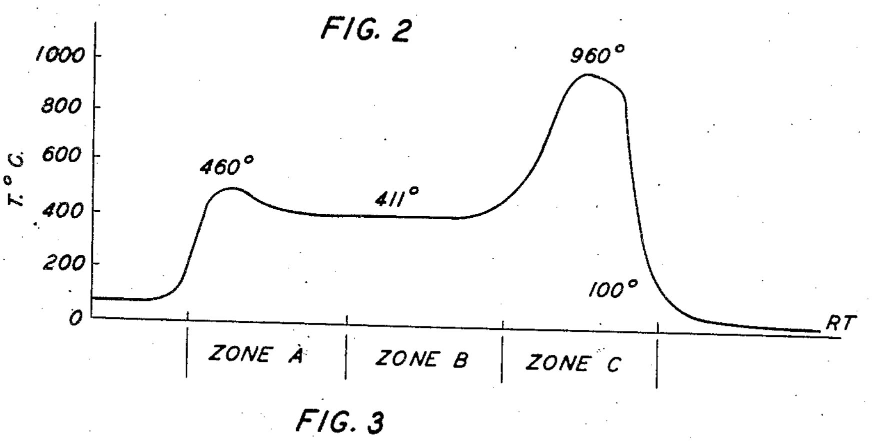
Fig. 2 is a graph portraying the temperature distribution in the apparatus shown in Fig. 2.

In general, in the use of the apparatus the sources 18, 23, 24 and 25 energize the heater elements associated therewith to produce within the reaction vessel a temperature distribution of the form illustrated in Fig. 2. A continual flow of an appropriate gas, for example hydrogen, is introduced through the vessel by way of the inlets 12 and 13. Iodine vapor is carried along with the hydrogen flow and reacts with the germanium 27 to produce germanium iodides, namely $GeI_2$ and $GeI_4$. This vapor is decomposed pyrolytically whereby germanium is deposited upon the discs 28. It has been found that for the temperature distribution illustrated in Fig. 2 the major deposition of germanium in film form upon the discs 28 occurs at and beyond, namely to the right in Fig. 1, of the middle of zone A.

In one specific application, hydrogen was passed through the reaction vessel at a rate of 0.07 cubic centimeter per second, the portion 11 of the vessel being cylindrical and seven-eighth inch in diameter. The hydrogen saturated with iodine vapor, the temperature in the bath 16 being maintained at 45° C. The hydrogen-iodine vapor flow continued for about sixteen hours, over the N germanium discs 28, which were one-half inch in diameter. The germanium mass 27 was of P conductivity type containing one per cent gallium. Germanium films of the order of 0.003 inch thick were deposited on the discs 28.

Figure 3:
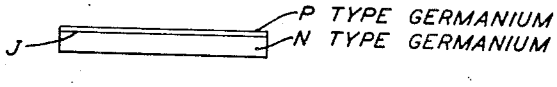
Fig. 3 is a side view of a germanium body having P and N type regions therein, constructed in accordance with this invention.

The deposited films were of P conductivity-type germanium, were of single crystal structure, with the same crystallographic orientation as the discs 28 and substantially strain free. The unit construction produced is illustrated in Fig. 3 and comprises the N type germanium base or substratum and the P type film, the two forming the PN junction J. This junction has marked rectification properties. For example, in a typical device of the form illustrated in Fig. 3, the junction exhibited a rectification ratio of the order of 1,000 at one volt.

Solid germanium and iodine vapor combine to form a gaseous phase at temperatures as low as about 300° C. A diluent, hydrogen in the embodiment above described, is advantageous to moderate the reaction, the dilution ratio being in excess of 10:1 in the case given. Pure hydrogen, it has been found, is a particularly efficacious diluent, from the standpoint of deposition of films upon the discs or bodies 28. For example, it reduces the decomposition temperature of germanium iodide. If the hydrogen is contaminated with of the order of one per cent nitrogen, formation of germanium needles on the walls of the vessel portion 11 occurs.

It will be noted from the foregoing description and particularly from Fig. 2 that the pyrolytic decomposition of the germanium iodides is effected at below 500° C. which is the temperature at which N type germanium and germanium having long hole lifetimes are stable.

Although the invention has been described with particular reference to the deposition of a single crystal film of P type germanium by the use of a germanium mass 27 containing gallium as the acceptor impurity, other such impurities such as indium, aluminum or boron may be used. Also, the invention may be utilized to produce N conductivity-type films, in which case the germanium mass may be one containing a donor impurity, such as arsenic or phosphorous, and the discs 28 may be of P conductivity-type germanium. Further, the invention may be utilized to produce successive layers of different conductivities or opposite conductivity types. For example, after the deposition of an N type film or layer, an acceptor impurity in the form of gallium iodide, aluminum iodide, or boron iodide may be introduced into the reaction chamber, as by an inlet similar to the inlet 12, whereby, depending upon the proportion of the impurity, the next deposited film of germanium will be of less strong N type or of P type. Donor impurities may be introduced similarly. In like manner, by controlling the proportion of the added impurity, the conductivity of the deposited film or films may be controlled, for example to produce a gradation in conductivity toward or away from the PN junction in the resulting germanium body. The introduction of the conductivity type determining impurity, that is the donor or acceptor impurity, may be made concomitantly with the film deposition whereby disturbing or straining of the surface and resultant imperfection of the crystalline structure of the film are avoided. In this respect, the use of "determining" in the phrase "conductivity type determining" is in the sense of fixing or establishing and not of ascertaining.

It is to be noted also that although in the specific embodiment described hereinabove germanium iodide was utilized, other germanium compounds, for example the bromide, chloride (digermane) or hydride may be employed. Also, although the invention has been described with particular reference to the fabrication of germanium bodies, it may be utilized also to produce silicon bodies having one or more PN junctions therein.

Finally, it will be understood that the specific embodiment of the invention described hereinabove is but illustrative and that various modifications may be made therein without departing from the scope and spirit of this invention.

What is claimed is:

1. The method of forming a layer of germanium upon a body of germanium which comprises mounting said body in a chamber, passing over said body a mixture of hydrogen, germanium halide and an impurity determining a conductivity type opposite to that of said body, in gas form, and heating said chamber to thermally decompose said halide.

2. The method of forming a layer of germanium upon a body of germanium which comprises mounting said body in a chamber, passing over said body a mixture of hydrogen, germanium iodide and an impurity determining a conductivity type opposite to that of said body, in gas form, and heating said chamber to thermally decompose said iodide.

3. The method of forming upon a germanium body a film of germanium of conductivity different from that of said body which comprises mounting said body in a chamber, producing a flow of hydrogen through said chamber, introducing into the chamber a vapor of germanium compound including an impurity determining the conductivity type of said film, and heating the chamber to decompose said compound.

4. The method of forming a layer of N type germanium upon a body of P type germanium which comprises mounting said body in a chamber, establishing a continual flow of hydrogen through said chamber, passing over said body a vapor of germanium iodide including a donor impurity, and heating the chamber to thermally decompose said iodide.

5. The method of forming a layer of P type germanium upon a body of N type germanium which comprises mounting said body in a chamber, passing over said body a mixture of hydrogen and vapor of germanium iodide including an acceptor impurity, and heating the chamber to thermally decompose said iodide.

6. The method of forming a layer of one conductivity type germanium upon a body of germanium of the opposite conductivity type which comprises mounting said body in a chamber, introducing into the chamber, in proximity to said body and in vapor phase a halide of germanium of said one conductivity type, producing a flow of hydrogen through said chamber, and heating said chamber to thermally decompose said halide.

7. The method in accordance with claim 6 comprising introducing determining the conductivity type of said layer and in vapor phase into said chamber.

8. The method of forming a layer of one conductivity type germanium upon a body of germanium of the opposite conductivity type which comprises mounting in a chamber a quantity of iodine, a mass of germanium of said one conductivity type and a body of germanium of said opposite conductivity type, passing hydrogen through said chamber and over the iodine, germanium mass and germanium body in succession, heating the iodine to about 45° C., and maintaining a temperature between about 410° C. and 460° C. in said chamber in the vicinity of the germanium mass and body.

9. The method of forming a film of germanium of one conductivity and conductivity type upon a germanium body of different conductivity which comprises mounting a quantity of iodine, a mass of germanium of said one conductivity type and a body of germanium in a chamber, producing a flow of hydrogen through said chamber and passing over the iodine, germanium mass and body in succession, heating the iodine to vaporizing temperature, and maintaining a temperature of the order of 400° C. in the vicinity of said mass and body.

10. The method in accordance with claim 9 which comprises introducing an iodide of an impurity determining the conductivity type of said film, in the vapor phase, into said chamber.

11. The method of producing a semiconductor element having a PN junction therein which comprises mounting a single crystal body of semiconductive material selected from the group consisting of germanium and silicon and of one conductivity type in a chamber, producing a flow of hydrogen through said chamber, introducing into said chamber a vapor of a compound of the semiconductive material and including an impurity characteristic of the opposite conductivity type, and heating the chamber to decompose said vapor.

12. The method of producing a semiconductive element which comprises mounting a single crystal body of N type semiconductive material selected from the group consisting of germanium and silicon in a chamber, introducing into said chamber a mixture of hydrogen and vapor of a compound of said material and including an acceptor impurity, and heating said chamber to decompose said vapor.

13. The method of producing a semiconductive element which comprises mounting a single crystal body of P type semiconductive material selected from the group consisting of germanium and silicon in a chamber, introducing into said chamber a mixture of hydrogen and vapor of a compound of said material and including a donor impurity, and heating said chamber to decompose said vapor.

References Cited in the file of this patent

UNITED STATES PATENTS

| Number | Name | Date |
|---|---|---|
| 2,462,681 | Schaefer | Feb. 22, 1949 |
| 2,552,626 | Fisher et al. | May 15, 1951 |
| 2,556,711 | Teal | June 12, 1951 |
| 2,556,991 | Teal | June 12, 1951 |